(12) United States Patent
Yan et al.

(10) Patent No.: US 8,063,153 B2
(45) Date of Patent: Nov. 22, 2011

(54) FUNCTIONALIZED POLYMER WITH LINKING GROUP

(75) Inventors: Yuan-Yong Yan, Copley, OH (US); David F. Lawson, Uniontown, OH (US)

(73) Assignee: Bridgestone Corporation, Tokyo (JP)

( * ) Notice: Subject to any disclaimer, the term of this patent is extended or adjusted under 35 U.S.C. 154(b) by 578 days.

(21) Appl. No.: 10/579,954

(22) PCT Filed: Oct. 20, 2005

(86) PCT No.: PCT/US2005/038017
§ 371 (c)(1),
(2), (4) Date: May 22, 2006

(87) PCT Pub. No.: WO2006/047328
PCT Pub. Date: May 4, 2006

(65) Prior Publication Data
US 2007/0149744 A1 Jun. 28, 2007

Related U.S. Application Data

(60) Provisional application No. 60/622,188, filed on Oct. 26, 2004.

(51) Int. Cl.
*C08C 19/25* (2006.01)

(52) U.S. Cl. .......... 525/342; 525/331.9; 525/332.9; 525/331.1; 525/333.2; 525/333.3; 525/333.6; 525/379; 526/82; 526/83; 526/87; 526/335; 526/340; 526/346; 526/347

(58) Field of Classification Search .......... 525/100, 525/342, 379; 528/25
See application file for complete search history.

(56) References Cited

U.S. PATENT DOCUMENTS

| | | | |
|---|---|---|---|
| 4,618,650 A | 10/1986 | Halasa et al. | |
| 5,561,210 A | 10/1996 | Roy | |
| 5,652,310 A | 7/1997 | Hsu et al. | |
| 5,811,479 A * | 9/1998 | Labauze | 524/188 |
| 5,929,149 A | 7/1999 | Matsuo et al. | |
| 5,977,238 A | 11/1999 | Labauze | |
| 6,013,718 A | 1/2000 | Cabioch et al. | |
| 6,020,430 A | 2/2000 | Schwindeman et al. | |
| 6,071,995 A | 6/2000 | Labauze | |
| 6,258,891 B1 * | 7/2001 | Hoxmeier | 524/848 |
| 6,294,624 B1 * | 9/2001 | Inoue et al. | 526/93 |
| 6,555,644 B2 | 4/2003 | Ko et al. | |
| 6,558,805 B2 | 5/2003 | Khadir et al. | |
| 6,624,256 B2 | 9/2003 | Kwag et al. | |
| 6,667,362 B2 | 12/2003 | Robert et al. | |
| 6,841,648 B2 | 1/2005 | Grün et al. | |
| 6,846,873 B2 | 1/2005 | Ko et al. | |
| 6,900,263 B2 | 5/2005 | Hodge | |
| 7,067,592 B2 | 6/2006 | Chino et al. | |
| 7,151,140 B2 | 12/2006 | Jang et al. | |
| 7,262,254 B2 | 8/2007 | Zanzig | |
| 7,342,070 B2 | 3/2008 | Tsukimawashi et al. | |
| 2002/0128426 A1 * | 9/2002 | Schreffler et al. | 528/272 |
| 2002/0173607 A1 * | 11/2002 | Brockmann | 526/173 |
| 2004/0127645 A1 | 7/2004 | Ko et al. | |
| 2004/0254301 A1 | 12/2004 | Tsukimawashi et al. | |
| 2005/0070672 A1 | 3/2005 | Ozawa et al. | |
| 2006/0135701 A1 | 6/2006 | Lawson et al. | |
| 2008/0045664 A1 | 2/2008 | Sone et al. | |
| 2009/0143525 A1 | 6/2009 | Ashiura et al. | |
| 2009/0156728 A1 | 6/2009 | Ashiura et al. | |
| 2009/0292044 A1 | 11/2009 | Kawazura et al. | |

OTHER PUBLICATIONS

White, Journal of Colloid and Interface Science 232, 400-407 (2000).*
Frei, Journal of Physical Chemistry A (2009), 113, 6612-6619.*
"Unsaturation" definition.*
V. Bellas et al., "Controlled Anionic Polymerization of Hexamethylcyclo-trisiloxane. Model Linear and Miktoarm Star Co- . . . ," Macromolecules, Aug. 18, 2000, 2000/33, pp. 6993-6997.
T. Huang et al., "Synthesis and Characterization of (star polystyrene)-block-(linear polydimethylsiloxane)-block- . . . ," Polymer Bulletin, Aug. 2002, 49, pp. 143-150.
K. Almdal et al., "Order, Disorder, and Composition Fluctuation Effects in Low Molar Mass Hydrocarbon-Poly (dimethylsiloxane) . . . ," Macromolecules, Jun. 1996, 1996/29, pp. 5940-5947.
J. Lee et al., "Synthesis and Characterization of Well-Defined Poly(alpha-methylstyrene)-b-poly(dimethylsiloxane) Block . . . ," Macromolecules, Feb. 28, 2001, 2001/34, pp. 2095-2100.
R. Schmidt et al., "Modulus Reduction Mechanism of Trimethylsiloxy Silicates in Polyorganosiloxanes," Polymer Preprints, 2001/42(1), pp. 112-113.
P. Dvornic et al., "Poly(amidoamine-organosilicon) (PAMAMOS) Dendrimers and Their Derivatives of Higher Degree of Structural . . . ," Polymer Preprints, 2001/42(1), pp. 126-127.
J. Mabry et al., "Dehydrogenative Silylation Copolymerization—Synthesis of Copoly [arylene-1,2-dioxy/oligodimethylsiloxanylene] . . . ," Polymer Preprints, 2001/42(1), pp. 153-154.
H. Shinoda et al., "Improving Structural Control of PMMA-g-PDMS Graft Copolymers by ATRP," Polymer Preprints, 2001/42(1), pp. 161-162.
A. McGregor et al., "Observations on the Synthesis of 1,3,5-Tris(3-Trimethoxysilylpropyl)-Isocyanurate," Polymer Preprints, 2001/42(1), pp. 167-168.
D. Loy et al., "Sol-Gel Chemistry of 3-Isocyanatopropyltriethoxysilane," Polymer Preprints, 2001/42(1), pp. 180-181.
A. Sanchez et al., "Sol-Gel Chemistry of Aminopropyltrialkoxysilanes," Polymer Preprints, 2001/42(1), pp. 182-183.
G. Cai et al., "Synthesis and Properties of Isomeric Poly(1-hydrido-1-trimethoxysiloxy-tetramethyltrisiloxane) and . . . ," Polymer Preprints, 2001/42(1), pp. 198-199.

* cited by examiner

*Primary Examiner* — Vasu Jagannathan
*Assistant Examiner* — Robert C Boyle
(74) *Attorney, Agent, or Firm* — Meredith E. Hooker; Zollinger & Burleson Ltd.

(57) ABSTRACT

A functionalized polymer includes an elastomer, a terminal functional group including at least one heteroatom, and a unit intermediate the elastomer and the functional group; the intermediate unit includes a terminal moiety which, in its anionic form, is less basic than a secondary amino radical ion. Methods of making the functionalized polymer and of using it with particulate filler to make, e.g., a tire tread composition also are disclosed.

16 Claims, No Drawings

FUNCTIONALIZED POLYMER WITH LINKING GROUP

CROSS REFERENCE TO RELATED APPLICATIONS

This application is a US. national stage of international application PCT/US2005/038017, filed Oct. 20, 2005, and claims the benefit of U.S. provisional patent application No. 60/622,188, filed Oct. 26, 2004.

BACKGROUND INFORMATION

1. Field of the Invention

The invention relates to the manufacture and use of functionalized polymers capable of interacting with fillers.

2. Background of the Invention

Tire treads, power belts, and the like often are made from compositions that contain one or more elastomers and one or more reinforcing materials such as, for example, particulate carbon black and silica. For a general discussion of this topic, see, e.g., *The Vanderbilt Rubber Handbook*, 13th ed. (1990), pp. 603-04.

Safety and durability considerations mandate that tire treads provide both good traction and resistance to abrasion; however, motor vehicle fuel efficiency concerns argue for a minimization in their rolling resistance, which correlates with a reduction in hysteresis and heat build-up during operation of the tire. The foregoing considerations are, to a great extent, competing and somewhat contradictory: a tire tread composition designed to improve tread traction on the road usually results in increased rolling resistance and vice versa.

Typically, filler(s), elastomer(s), and additives are chosen so as to provide an acceptable balance of these properties. Ensuring that constituent reinforcing filler(s) are well dispersed throughout the elastomeric material(s) in such compositions both enhances processability and acts to improve physical properties such as, e.g., compound Mooney viscosity, elastic modulus, tan δ, and the like. Resulting articles made from such compositions can exhibit desirable properties such as reduced hysteresis, reduced rolling resistance, and good traction on wet pavement, snow and ice.

Increasing the interaction with elastomer(s) is one way to improve their dispersion. Examples of efforts of this type include high temperature mixing in the presence of selectively reactive promoters, surface oxidation of the compounding materials, surface grafting, and chemical modifications to the terminal ends of the polymers with, e.g., amines, tin compounds, and the like.

Because elastomers used in such compositions often are anionically polymerized, attachment of certain functional groups, particularly amines, is difficult. This is because living polymers are terminated by active hydrogen atoms such as are present in, e.g., hydroxyl groups, thiol groups, and particularly primary and secondary amine groups. This undesired termination can be avoided through use of reaction schemes that allow for attachment of non-amine N-containing compounds followed by conversion to amines, i.e., indirect attachment schemes.

Continued hysteresis reduction and provision of a direct mechanism for attaching amine functionality to a living polymer both remain highly desirable.

SUMMARY OF THE INVENTION

In one aspect is provided a functionalized polymer that includes an elastomer with a terminal functional group including at least one heteroatom. Between the elastomer and the functional group is a unit that includes a terminal moiety which, in its anionic form, is less basic than a secondary amino radical ion.

In another aspect is provided a method of making a functionalized polymer. A polymer that includes at its living end a unit including a terminal moiety which, in its anionic form, is less basic than a secondary amino radical ion is allowed to react with a compound that includes at least one heteroatom, with the product of that reaction constituting the functionalized polymer.

In yet another aspect is provided a composition that includes at least one reinforcing filler and a functionalized polymer of the type described above.

In a further aspect is provided a method of making a vulcanizate, such as a tire tread, that includes vulcanizing the foregoing composition.

In a still further aspect is provided a method of directly attaching a compound that includes a primary or secondary amine group to a polymer so as to provide an amine-functionalized polymer. The method includes providing a reaction medium in which a living polymer can be reacted with a cyclic compound that includes a heteroatom so as to provide an extended living polymer bearing an anionic charge on the heteroatom; introducing into the reaction medium an amine that includes an active hydrogen atom attached to the amino nitrogen; and allowing the amine functionality to chemically bond to the extending unit so as to provide an amine-functionalized polymer.

Other aspects of the present invention will be apparent to the ordinarily skilled artisan from the detailed description that follows. To assist in understanding that description of the invention, certain definitions are provided immediately below. These definitions apply hereinthroughout unless a contrary intention is explicitly indicated:

"polymer" means the polymerization product of one or more monomers and is inclusive of homo-, co-, ter-, tetra-polymers, etc.;

"polyene" means a compound with multiple carbon-to-carbon double bonds and includes dienes, trienes, etc.;

"mer" or "mer unit" means that portion of a polymer derived from a single reactant molecule (e.g., an ethylene mer unit has the general formula —$CH_2CH_2$—);

"homopolymer" means a polymer consisting essentially of a single type of repeating mer unit;

"copolymer" means a polymer that includes mer units derived from two reactants (normally monomers) and is inclusive of random, block, segmented, graft, etc., copolymers;

"interpolymer" means a polymer that includes mer units derived from at least two reactants (normally monomers) and is inclusive of copolymers, terpolymers, tetrapolymers, and the like;

"macromolecule" means an oligomer or polymer;

"terminus" means an end of a constituent chain of a macromolecule;

"terminal moiety" means that portion of a molecule located at its terminus;

"radical" or "residue" means the portion of a molecule that remains after reacting with another molecule;

"chemically bonded" means attached through a bond that is covalent or ionic;

"secondary amino radical ion" means an anion having the general formula $R^1R^2N^-$ where $R^1$ and $R^2$ independently are alkyl, aryl, alkenyl, etc., hydrocarbon-containing chains with the proviso that one or both of $R^1$ and $R^2$ can be polymeric;

"heteroatom" means an atom other than carbon or hydrogen; and

"hysteresis" means the difference between the energy applied to deform an article made from an elastomeric compound and the energy released as the article returns to its initial, non-deformed state.

DETAILED DESCRIPTION OF ILLUSTRATIVE EMBODIMENTS

The functionalized polymer includes a polymeric chain with a terminal functional group including at least one heteroatom and, intermediate the elastomer and the functional group, a unit that includes a terminal moiety which, in its anionic form, is less basic than a secondary amino radical ion. This functionalized polymer can be represented by the general formula E-A-G$_t$, where E is an elastomer, G$_t$ is a terminal functional group that includes at least one heteroatom, and A is a unit that includes a terminal moiety as just described. Those of ordinary skill in the chemical arts are familiar with relative basicities (commonly denoted as pK$_b$) and, accordingly, are aware of those atoms that can be present in the type of terminal moiety just described. Two relatively common heteroatoms that can form anions meeting this basicity requirement are O and S.

The polymeric chain preferably is elastomeric. Accordingly, it can include mer units that include unsaturation, which can be mer units derived from polyenes, particularly dienes and trienes (e.g., myrcene). Preferred polyenes include $C_4$-$C_{12}$ dienes. Particularly preferred are conjugated dienes such as, but not limited to, 1,3-butadiene, isoprene, 1,3-pentadiene, 2,3-dimethyl-1,3-butadiene, and 1,3-hexadiene. Homo- and co-polymers that include just polyene-derived mer units constitute one preferred type of elastomer.

The polymeric chain also can include mer units derived from vinyl aromatics, particularly the $C_8$-$C_{20}$ vinyl aromatics such as, e.g., styrene, α-methyl styrene, p-methyl styrene, the vinyl toluenes, and the vinyl naphthalenes. When used in conjunction with one or more polyenes, the vinyl aromatic-derived mer can constitute from about 1 to about 50% by wt., preferably from about 10 to about 45% by wt, and more preferably from about 20 to about 35% by wt., of the polymer chain. Interpolymers of polyene(s) and vinyl aromatic(s) constitute another preferred type of elastomer. Especially when such interpolymers are to be used in applications such as tire treads, the resulting interpolymers preferably are random in nature, i.e., the mer units derived from each type of constituent monomer preferably do not form blocks and, instead, are incorporated in a non-repeating, essentially simultaneous, generally random manner.

Particularly preferred elastomers include poly(butadiene), (poly)isoprene (either natural or synthesized), and interpolymers of butadiene and styrene such as, e.g., copoly(styrene/butadiene) also known as SBR.

Polyenes can incorporate into polymeric chains in more than one way. Especially for tire tread applications, controlling the manner in which the polyene mer units are incorporated into the polymer (i.e., the 1,2-microstructure of the polymer) can be desirable. Based on total polyene content, a polymer chain preferably has an overall 1,2-microstructure of from about 10 to about 80%, more preferably of from about 25 to 65%.

The number average molecular weight ($M_n$) of the polymer preferably is such that a quenched sample exhibits a gum Mooney viscosity (ML$_4$/100° C.) of from about 2 to about 150.

The foregoing polymers can be made by emulsion polymerization or solution polymerization, with the latter affording greater control with respect to such properties as randomness, microstructure, etc. Solution polymerizations have been performed since about the mid-20th century, and the general aspects thereof are known to the ordinarily skilled artisan, although certain aspects are provided here for convenience of reference.

Solution polymerization typically involves an initiator. Exemplary initiators include organolithium compounds, particularly alkyllithium compounds. Preferred organolithium initiators include N-lithio-hexamethyleneimine; n-butyllithium; tributyltin lithium; dialkylaminolithium compounds such as dimethylaminolithium, diethylamino-lithium, dipropylaminolithium, dibutylaminolithium and the like; dialkylaminoalkyl-lithium compounds such as diethylaminopropyllithium; and those triaUkly stanyl lithium compounds involving Ci—C$_{12}$ preferably Ci—C$_4$, alkyl groups.

Multifunctional initiators, i.e., initiators capable of forming polymers with more than one living end, also can be used. Examples of multifunctional initiators include, but are not limited to, 1,4-dilithiobutane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralittiiocyclohexane, and 4,4'-dilithiobiphenyl.

In addition to the organolithium initiators, also useful are the so-called functionalized initiators that become incorporated into the polymer chain, thus providing a functional group at the initiated end of the chain. Examples of such materials include the reaction product of organolithium compounds and, for example, N-containing organic compounds (e.g., substituted aldimines, ketimines, secondary amines, optionally pre-reacted with a compound such as düsopropenyl benzene. A more detailed description of these materials can be found in, e.g., U.S. Pat. Nos. 5,153,159 and 5,567,815.

Typical solution polymerization solvents include various $C_5$-$C_{12}$ cyclic and acyclic alkanes as well as their alkylated derivatives, certain liquid aromatic compounds, and mixtures thereof. Solvents capable of quenching the polymerization are avoided.

As mentioned previously, the mer units of the polymer can be incorporated randomly. hi solution polymerizations, randomization as well as vinyl content (i.e., 1,2-microstracture) can be increased through use of a coordinator, usually a polar compound, in the polymerization ingredients. Up to 90 or more equivalents of coordinator can be used per equivalent of initiator, with the amount depending on, e.g., the amount of vinyl content desired, the level of non-polyene monomer employed, the reaction temperature, and the nature of the specific coordinator employed. Compounds useful as coordinators include organic compounds having an O or N heteroatom and a non-bonded pair of electrons. Examples include dialkyl ethers of mono- and oligo-alkylene glycols; crown ethers; tertiary amines such as tetramethylethylene diamine; THF; THF oligomers; linear and cyclic oligomeric oxolanyl alkanes such as 2,2'-di(tetrahydrofiiryl) propane, di-piperidyl ethane, hexamethylphosphoramide, N,N'-dimethylpiperazine, diazabicyclooctane, diethyl ether, tributylamine, and the like. Details of linear and cyclic oligomeric oxolanyl coordinators can be found in U.S. Pat. No. 4,429,091, the teaching of which relating to the manufacture and use of such materials is incorporated by reference herein.

Although the ordinarily skilled artisan understands the type of conditions typically employed in solution polymerization, a representative description is provided for the convenience of the reader. The following is based on a batch process, although extending this description to, e.g., semi-batch or continuous processes is within the capability of the ordinarily skilled artisan.

Polymerization typically begins by charging a blend of the monomer(s) and solvent to a reaction vessel, followed by addition of coordinator (if used) and initiator, which often are added as part of a solution or blend; alternatively, the monomer(s) and coordinator can be added to the initiator. The procedure typically is carried out under anhydrous, anaerobic conditions. The reactants can be heated to a temperature of up to about 150° C. and agitated. After a desired degree of conversion has been reached, the heat source (if used) can be removed. If the reaction vessel is to be reserved solely for polymerizations, the reaction mixture can be removed to a post-polymerization vessel for functionalization and/or quenching.

To make a functionalized polymer, the polymer is provided with a functional group prior to its quenching. hi the present invention, this functionalization is preceded by the introduction of what has been referred to herein as an intermediate unit.

Many classes of compounds can be used to provide the intermediate unit. Each provides a terminal moiety which, in its anionic form, is less basic than a secondary amino radical ion. Secondary amino radical ions are themselves less basic than carbanions; however, both secondary amino radical ions and carbanions are sufficiently basic that they are terminated by active hydrogens, such as are in amine-containing compounds.

Examples of ions that are less basic than secondary amino radical ions include, but certainly are not limited to, —O⁻ and —S⁻. This is convenient because compounds mat contain O and S are plentiful, thus providing the ordinarily skilled artisan with a wide range of useful materials from which to choose.

A convenient method of delivering this type of terminal moiety to a polymer chain involves introducing a heteroatom-containing cyclic compound into a system that contains a living polymer. The conditions used to provide the living polymer typically are adequate to open the ring of the cyclic structure and allow the resulting radical to attach to the polymer. This radical, which constitutes the intermediate unit, has a terminal moiety which, in its anionic form, is less basic than a secondary amino radical ion.

Examples of heteroatom-containing cyclic compounds include, but are not limited to, cyclic siloxanes, epoxides, and the S-containing analogs of each. Of the siloxanes, preferred are those that can deliver up to 6, preferably 3 to 4, repeating polysiloxane units. Also preferred are those where at least some, preferably all, of the Si atoms are substituted with a $C_1$-$C_6$ substituent, preferably a $C_1$-$C_3$ alkyl group. Particularly preferred due to availability and cost are hexamethylcyclotrisiloxane and octamethylcyclotetrasiloxane.

With respect to the epoxides and episulfides, a wide range of commercially available materials can be utilized. Examples of such materials include various alkylene oxides and sulfides such as butylene oxide, various cycloalkene oxides and sulfides such as cyclohexene oxide, 1,2-epoxybutane, ethylene oxide, and 3-glycidoxypropyltrimeth-oxysilane; preferred are those materials with boiling points that are sufficiently high so as to remain liquid at temperatures commonly encountered during solution polymerizations. The intermediate unit resulting from the use of the epoxide or episulfide can be aliphatic or cyclic. This type of material can result in intermediate units that connect to the polymer chains by a carbon-to-carbon bond.

No particularly unusual reaction conditions or sequences are believed to be necessary to attach such intermediate units, although exemplary reaction conditions can be found below in the examples; reaction temperatures for this attachment generally range from about 45° to about 80° C., preferably between about 50° and about 72° C.

Generally, the compound(s) used to provide the intermediate unit is/are added in amounts so as to provide, on average, no more than two intermediate units per living polymer and preferably no more than one intermediate unit per living polymer. If more than one intermediate unit inserts itself, a mid-synthesis change in initiator system might become necessary. Conversely, by downwardly adjusting the amount of intermediate-forming compounds used, multiple polymer chains can attach to the same intermediate unit. In one embodiment, the amount of compound(s) used to provide the intermediate unit is selected such that the molar ratio of intermediate units to functional groups is from about 1:1 to about 1:6; in another embodiment, this ratio is about 1:3.

The intermediate unit generally constitutes a relatively minor proportion of the overall macromolecule; in general, its molecular weight typically is no more than about 400 g/mol, preferably no more than about 360 g/mol, more preferably no more than about 340 g/mol, and most preferably no more than about 320 g/mol.

As mentioned above, the terminal moiety of the resulting intermediate unit, in its anionic form, is less basic than a secondary amino radical ion. This allows the resulting anion to react with a compound that includes a reactive group and functional moiety capable of reacting or interacting (e.g., bonding, associating, etc.) with particulate fillers such as carbon black. Examples of such moieties are heteroatom-containing groups that have an active hydrogen atom attached to the heteroatom which, otherwise, would tend to terminate living (extended) polymers.

The intermediate-modified living polymer can be reacted with a compound of the type just described so as to provide the functionalized polymer. Examples of such compounds include, but are not limited to, alkoxysilanes such as methyltrimethoxysilane, tetraethylorthosilicate, 3-amino-propyltriethoxysilane, N-(3-triemoxy-silylpropyl)-4,5-dihydroimidazole (TEOSI), 3-isocyanatopropyltriethoxysilane, n-methylaminopropylmethyldimethoxysilane, n-methylaminopropyltrimethoxysilane, 3-aminopropyltrimethoxysilane, and $C_{15}H_{33}NSiOs$ (available as S340 from Sigma-Aldrich Co.; St. Louis, Mo.);

halogen-containing compounds such as $SiCl_4$, $SnCl_4$, acetyl chloride, p-toluoyl chloride, $CHsS(O)_2Cl$, p-toluoyl sulfonyl chloride, 3-chloropropylamine, 3-(2-bromo-ethyl)indole, n-methyl-3-bromopropylamine, 1-(3-bromopropyl)-2,2,5,5-tetramethyl-1-aza-2,5-disilacyclo pentane, $(CH_3)_2SiCl_2$, and $(CH_3)_3SiCl$;

anhydrides such as acetic anhydride, 4-methylbenzoic acid anhydride, methyl succinic anhydride, 4-methylphenyl-succmic anhydride, and 2-dodecen-1-yl succinic anhydride;

nitrogen-containing compounds such as formamide, DMF, 2-cyanopyrimidine, 1,3-propanediamine, and 1,4-diaminocyclohexane;

and O- and S-containing compounds such as sultones (e.g., 1,4-butane sultone).

Quenching typically is conducted by stirring the polymer and an active hydrogen-containing compound (e.g., an alcohol) for up to about 120 minutes at temperatures of from about 30° C. to 150° C. Solvent can be removed by conventional techniques such as drum drying, extruder drying, vacuum drying or the like, which may be combined with coagulation with water, alcohol or steam, thermal desolvation, etc.; if coagulation is performed, oven drying may be desirable.

The functionalized polymer can be utilized in a tread stock compound or can be blended with any conventionally employed tread stock rubber which includes natural rubber and/or non-functionalized synthetic rubbers such as, e.g., one or more of poly(isoprene), SBR, poly(butadiene), butyl rubber, neoprene, ethylene/propylene rubber (EPR), ethylene/propylene/diene rubber (EPDM), acrylonitrile/butadiene rubber (NBR), silicone rubber, fluoroelastomers, ethylene/acrylic rubber, ethylene/vinyl acetate inter-polymer (EVA), epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from about 5 to about 99% by wt. of the total rubber, with the conventional rubber(s) making up the balance of the total rubber. The minimum amount depends largely on the degree of reduced hysteresis desired.

Amorphous silica ($SiO_2$) can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix, which can be observed by thin section microscopy.

Surface area gives a reliable measure of the reinforcing character of different silicas; the Brunauer, Emmet and Teller ("BET") method (described in *J. Am. Chem. Soc*, vol. 60, p. 309 et seq.) is a recognized method for determining surface area. BET surface areas of less than 450 $m^2$/g, from about 32 to about 400 $m^2$/g, from about 100 to about 250 $m^2$/g, and from about 150 to about 220 $m^2$/g are preferred.

The pH of the silica filler is generally from about 5 to about 7 or slightly over, preferably from about 5.5 to about 6.8.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Degussa Corp. (Parsippany, N.J.), Rhodia Silica Systems (Cranbury, N.J.), and J.M. Huber Corp. (Edison, N.J.).

Silica can be employed in an amount of from about 1 to about 100 parts by weight (pbw) per 100 parts of polymer (phr), preferably from about 5 to about 80 phr. The useful upper range is limited by the high viscosity typically imparted by fillers of this type.

Other useful fillers include all forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 $m^2$/g, preferably at least about 35 to about 200 $m^2$/g or higher are preferred; surface area values can be determined by ASTM D-1765 using the cerylmethyl-ammonium bromide (CTAB) technique. The carbon blacks may be in pelletized form or an unpelletized flocculent mass, although unpelletized carbon black can be preferred for use in certain mixers.

The amount of carbon black can be up to about 50 phr, with about 5 to about 40 phr being typical. When carbon black is used with silica, the amount of silica can be decreased to as low as about 1 phr; as the amount of silica decreases, lower amounts of the processing aids, plus silane if any, can be employed.

Elastomeric compounds typically are filled to a volume fraction, which is the total volume of filler(s) added divided by the total volume of the elastomeric stock, of about 25%; accordingly, typical (combined) amounts of reinforcing fillers, i.e., silica and carbon black, is about 30 to 100 phr. In certain preferred embodiments, compositions that include the functionalized polymer of the present invention can include carbon black as the primary filler (i.e., a majority of the filler is carbon black) or the only filler.

When silica is employed as a reinforcing filler, addition of a coupling agent such as a silane is customary so as to ensure good mixing in, and interaction with, the elastomer(s). Generally, the amount of silane that is added ranges between about 4 and 20% by weight, based upon the weight of silica filler present in the elastomeric compound.

Coupling agents can have a general formula of Z-T—X, in which Z represents a functional group capable of bonding physically and/or chemically with a group on the surface of the silica filler (e.g., surface silanol groups); T represents a hydrocarbon group linkage; and X represents a functional group capable of bonding with the elastomer (e.g., via a S-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorganosiloxanes bearing the X and Z functionalities mentioned above. One preferred coupling agent is bis[3-(triethoxysilyl)propyl]tetrasulfide.

Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants are also useful, as set forth below. The additional fillers can be utilized in an amount of up to about 40 phr, preferably up to about 20 phr.

Other conventional rubber additives also can be added. These include, for example, plasticizers, antioxidants, curing agents and the like.

All of the ingredients can be mixed using standard equipment such as, e.g., Banbury or Brabender mixers.

Reinforced rubber compounds conventionally are cured with about 0.2 to about 5 phr of one or more known vulcanizing agents such as, for example, sulfur or peroxide-based curing systems. A general overview of suitable vulcanizing agents can be found in any of a variety of treatises such as, e.g., Kirk-Othmer, *Encyclopedia of Chem. Tech.*, 3d ed, (Wiley Interscience, New York, 1982), vol. 20, pp. 365-468.

The following non-limiting, illustrative examples provide the reader with detailed conditions and materials that can be useful in the practice of the present invention.

EXAMPLES

For all examples, dried glass vessels previously sealed with extracted septum liners and perforated crown caps under a positive N$_2$ purge, butadiene (~21% by wt. in hexane), styrene (33% by wt. in hexane), hexane, n-butyllithium (1.7 M in hexane), oligomeric oxolanyl propanes (1.6 M solution in hexane, stored over CaH$_2$), and BHT solution in hexane were used.

Commercially available reagents and starting materials included the following, all of which were used without further purification unless otherwise noted:
- from ACROS Organics (Geel, Belgium): methyltrimethoxysilane, tetraethyl orthosilicate, 3-aminopropyltriethoxysilane, hexamethylcyclotrisiloxane, and octa-methylcyclotetrasiloxane (with the cyclic siloxanes being dried over CaH$_2$ prior to use);
- from Sigma-Aldrich Co.: SiCl$_4$ and SnCl$_4$
- from Gelest, Inc. (Morrisville, Pa.): TEOSI, 3-isocyanatopropyl-triethoxysilane, N-methylaminopropyhnethyldimethoxysilane, and N-methylamino-propyltrimethoxysilane.

Testing data in the Examples was performed on filled compositions made according to the formulations shown in Tables Ia and Ib. In these, N-phenyl-iV'-(1$_5$3-dimethylburyl)-p-phenyldiamine acts as an antioxidant while benzothiazyl-2-cyclohexyl-sulfenamide, JV,JV'-diphenyl guanidine, and di(phenylthio)acetamide act as accelerators.

TABLE Ia

Compound formulation, carbon black only

| | Amount fphf) |
|---|---|
| Masterbatch | |
| polymer | 100 |
| carbon black (N343 type) | 55 |
| wax | 1 |
| N-phenyl-N'-(1,3-dimethylbutyl)-p-phenyldiamine | 0.95 |
| ZnO | 2.5 |
| stearic acid | 2 |
| aromatic processing oil | 10 |
| Final | |
| sulfur | 1.3 |
| benzothiazyl-2-cyclohexylsulfenamide | 1.7 |
| JV,iV'-diphenyl guanidine | 0.2 |
| TOTAL | 174.65 |

TABLE Ib

Compound formulation, carbon black and silica

| | Amount (phr) |
|---|---|
| Masterbatch | |
| polymer | 100 |
| silica | 30 |
| carbon black (N343 type) | 35 |
| N-phenyl-N'-(1,3-dimethylbutyl)-p-phenyldiamine | 0.95 |
| stearic acid | 1.5 |
| aromatic processing oil | 10 |
| Re-mill | |
| 60% disulfide silane on carrier | 4.57 |
| Final | |
| ZnO | 2.5 |
| sulfur | 1.7 |
| benzothiazyl-2-cyclohexylsulfenamide | 1.5 |
| di(phenylthio)acetamide | 0.25 |
| N,N'-diphenyl guanidine | 0.2 |
| TOTAL | 188.47 |

Data corresponding to "50° C. Dynastat tan δ" were acquired from tests conducted on a Dynastat™ mechanical spectrometer (Dynastatics Instruments Corp.; Albany, N.Y.) using the following conditions: 1 Hz, 2 kg static mass and 1.25 kg dynamic load, a cylindrical (9.5 mm diameter×16 mm height) vulcanized rubber sample, and 50° C.

Data corresponding to "Bound Rubber" were determined using the procedure described by J J. Brennan et al., *Rubber Chem. and Tech.*, 40, 817 (1967).

Examples 1-3

Standard Initiator (n-BuLi)

For Examples 1-3, a polymer batch was prepared using a standard organolithium initiator. Three samples were taken and reacted with different compounds.

To a N$_2$-purged reactor equipped with a stirrer was added 1.47 kg hexane, 0.41 kg styrene (in hexane), and 2.60 kg butadiene (in hexane). The reactor was charged with 3.68 mL n-butyllithium solution followed by 1.18 mL OOPs solution. The reactor jacket was heated to 50° C. and, after ~22 minutes, the batch temperature peaked at ~66° C. After an additional 10 minutes, the polymer cement was removed from the reactor and stored in separate dried glass vessels.

The vessels were placed in a 50° C. bath for 30 minutes. To two of the vessels (samples 1 and 2) were added, respectively, N,N-TMS-aminopropyltriethoxysilane and hexamethylcyclotrisiloxane (1.0 M in hexane); to the other was added isopropanol as a quenching agent. Each was coagulated in isopropanol containing BHT and drum dried.

Examples 4-5

Functional Initiator (DAPDT)

For Examples 4-5, a polymer batch was prepared using a functional initiator. Two samples taken from this batch were terminated separately.

To aNrpurged reactor equipped with a stirrer was added 1.47 kg hexane, 0.41 kg styrene, and 2.60 kg butadiene (in hexane). The reactor was charged with a mixture of 1.48 g 2-(4-dirnethylamino)phenyl-1,3-ditbiane in 10 nL THF, 1 mL triethylamine, and 3.68 mL n-butyllithrum solution. The contents were agitated at 24° C. for 5 minutes before addition of 1.04 mL OOPs solution. The reactor jacket was heated to 50° C. and, after ~18 minutes, the batch temperature peaked at ~71° C. After an additional 10 minutes, samples of the polymer cement were removed from the reactor and stored in separate dried glass vessels.

Further processing was performed in a 50° C. bath for 30 minutes; sample 4 was reacted with hexamethylcyclotrisiloxane (1.0 M in hexane) while sample 5 was quenched with isopropanol. Each was coagulated and drum dried as described above with respect to Examples 1-3.

The samples prepared in Examples 1-5 were used to prepare to prepare vulcanizable elastomeric compounds containing reinforcing fillers using the formulation from Table Ib.

Results of physical testing on these compounds are shown below in Table 2. From this data, a reinforced SBR polymer having a hexamethylcyclotrisiloxane-derived intermediate unit (Examples 2 and 4), regardless of the type of initiator used, can be seen to provide a greater than 30% reduction in tan δ (see 50° C. strain sweep data) compared to a control polymer (Examples 3 and 5, respectively). A TMS-protected aminopropyltri-ethoxysilane-reacted polymer (Example 1) showed a slight reduction in tan δ compared to its base polymer (Example 3).

TABLE 2

Testing data from Examples 1-5

|  | 1 | 2 | 3 | 4 | 5 |
|---|---|---|---|---|---|
| $M_n$ (kg/mol) | 104 | 102 | 102 | 120 | 115 |
| $M_w/M_n$ | 1.17 | 1.03 | 1.04 | 1.08 | 1.04 |
| % coupling | 8.2 | 0.0 | 0.0 | 7.2 | 8.9 |
| $T_g$ (° C.) | −36.4 | −37.1 | −36.0 | −38.4 | −38.0 |
| 171° C. MDR t50 (min) | 7.2 | 6.6 | 6.3 | 5.8 | 5.21 |
| 171° C. MH-ML (kg-cm) | 20.8 | 15.4 | 22.8 | 17.5 | 24.51 |
| $ML_{1+4}$ @ 130° C. | 53.3 | 78.8 | 49.9 | ND[1] | 70.0 |
| 300% modulus @ 23° C. (MPa) | 8.3 | 11.5 | 8.1 | 12.9 | 10.5 |
| Tensile strength @ 23° C. (MPa) | 12.6 | 15.3 | 11.2 | 18.3 | 14.8 |
| Temp. sweep 0° C. tan δ | 0.181 | 0.228 | 0.177 | 0.229 | 0.182 |
| Temp. sweep 50° C. tan δ | 0.234 | 0.203 | 0.241 | 0.162 | 0.211 |
| RDA 0.25-14% ΔG' (MPa) | 7.359 | 0.209 | 7.872 | 1.932 | 6.235 |
| 50° C. RDA strain sweep (5% strain) tan δ | 0.2352 | 0.1725 | 0.2606 | 0.1398 | 0.2068 |
| 50° C. Dynastat tan δ | 0.2105 | 0.1656 | 0.2111 | 0.1394 | 0.1864 |

[1]Not determined. Initial surge in property exceeded pre-set limit fox testing device.

Examples 6-24

Functionalized Polymers with Hexamethylcyclotrisiloxane Intermediate Units

Using essentially the same procedure described for Examples 1-5, a $N_2$-purged reactor equipped with a stirrer was charged with hexane, styrene, and butadiene, followed by sequential charges of small amounts of n-BuLi and OOPs. The reactor jacket was heated and, after 20-30 minutes, the batch temperature peaked at 10°-15° C. above the jacket temperature. After an additional ~10 minutes, samples of the polymer cement were removed from the reactor and stored in separate dried glass vessels.

In a 50° C. bath for ~30 minutes, samples 6, 12, and 18 were quenched with isopropanol while the others (7-11, 13-17, and 19-23) were reacted with hexamethylcyclotrisiloxane to provide an intermediate unit. Three of these (7, 13, and 19) were quenched with isopropanol while the others were reacted with the following materials, followed by isopropanol quenching:

8) methyltrimethoxysilane,
9, 20) 3-aminopropyltriethoxysilane,
10) TEOSI,
11) S340,
14, 21) 3-aminopropyltrimethoxysilane,
15, 23) [3-(methylamino)propyl]trimethoxysilane,
16) 2-dodecen-1-yl succinic anhydride,
17) 1-(3-bromopropyl)-2,2,5,5-tetramethyl-1-aza-2,5-disilacyclopentane,
22) N-[3-(trimethoxysilyl)propyl]etkylenediamine, and
24) benzosulfimide (i.e., saccharin).

Each sample was coagulated, drum dried, and. compounded substantially as in Examples 1-5 to yield polymers and vulcanizable compositions with properties as shown below in Table 3 (Examples 6-11), Table 4 (Examples 12-17), and Table 5 (Examples 18-24). For those rows that include two data points, the upper is for a formulation from Table Ia, and the lower is for a formulation from Table Ib.

TABLE 3

Testing/data from Examples 6-11

|  | 6 | 7 | 8 | 9 | 10 | 11 |
|---|---|---|---|---|---|---|
| $M_n$ (kg/mol) | 98 | 95 | 100 | 108 | 105 | 105 |
| $M_w/M_n$ | 1.05 | 1.02 | 1.08 | 1.16 | 1.14 | 1.13 |
| % coupling | 4.8 | 0.0 | 10.2 | 21.2 | 15.5 | 15.5 |
| Tg (° C.) | −35.9 | −38.1 | −37.7 | −37.4 | −38.1 | −37.5 |
| Bound rubber (%) | — | 7.7 | 11.7 | 24.4 | 19.9 | 22.7 |
|  |  | 67.5 | 66.0 | 68.1 | 63.0 | 67.3 |
| 171° C. MDRt50 (min) | — | 2.87 | 3.20 | 2.49 | 2.79 | 2.65 |
|  |  | 7.19 | 6.83 | 7.01 | 8.43 | 6.62 |
| 171° C. MH-ML (kg-cm) | — | 17.1 | 15.5 | 15.4 | 16.4 | 17.8 |
|  |  | 16.0 | 16.8 | 15.4 | 14.9 | 15.9 |
| $ML_{1+4}$ @ 130° C. | — | 16.6 | 19.9 | 23.4 | 23.4 | 23.3 |
|  |  | 74.6 | 72.5 | 72.3 | 70.4 | 73.8 |
| 300% modulus @ 23° C. (MPa) | — | 10.2 | 8.9 | 10.4 | 10.2 | 12.0 |
|  |  | 11.7 | 12.5 | 11.8 | 10.2 | 11.8 |
| Tensile strength @ 23° C. (MPa) | — | 16.1 | 16.2 | 18.3 | 14.4 | 17.3 |
|  |  | 15.3 | 14.0 | 16.2 | 17.1 | 14.8 |
| Temp. sweep 0° C. tan δ | — | 0.334 | 0.342 | 0.335 | 0.337 | 0.353 |
|  |  | 0.244 | 0.252 | 0.238 | 0.236 | 0.238 |
| Temp. sweep 50° C. tan δ | — | 0.263 | 0.265 | 0.250 | 0.250 | 0.244 |
|  |  | 0.182 | 0.193 | 0.187 | 0.195 | 0.190 |
| RDA 0.25-14% ΔG' (MPa) | — | 4.968 | 4.869 | 2.941 | 3.210 | 4.289 |
|  |  | 2.113 | 2.196 | 1.822 | 1.903 | 1.974 |
| 50° C. RDA strain sweep (5% strain) tan δ | — | 0.2684 | 0.2820 | 0.2273 | 0.2353 | 0.2365 |
|  |  | 0.1883 | 0.1786 | 0.1779 | 0.1873 | 0.1790 |
| 50° C. Dynastat tan δ | — | 0.2581 | 0.2635 | 0.2069 | 0.2150 | 0.2055 |
|  |  | 0.1762 | 0.1725 | 0.1763 | 0.1771 | 0.1751 |

TABLE 4

Testing data from Examples 12-17

| | 12 | 13 | 14 | 15 | 16 | 17 |
|---|---|---|---|---|---|---|
| $M_n$ (kg/mol) | 97 | 99 | 92 | 95 | 103 | 100 |
| $M_w/M_n$ | 1.03 | 1.05 | 1.10 | 1.08 | 1.08 | 1.06 |
| % coupling | 0.0 | 5.0 | 8.7 | 8.9 | 11.5 | 6.8 |
| $T_g$ (° C.) | −36.9 | −36.8 | −36.1 | −37.0 | −37.2 | −36.4 |
| Bound rubber (%) | 10.7 | 12.5 | 32.9 | 24.1 | 14.2 | 11.5 |
| | 15.9 | 63.8 | 71.1 | 73.2 | 19.5 | 13.9 |
| 171° C. MDR $t_{50}$ (min) | 2.96 | 2.90 | 2.81 | 2.74 | 2.53 | 3.00 |
| | 7.67 | 7.24 | 7.04 | 6.47 | 6.09 | 7.37 |
| 171° C. MH-ML (kg-cm) | 16.7 | 17.9 | 15.5 | 16.8 | 16.7 | 17.5 |
| | 23.0 | 16.0 | 16.4 | 15.3 | 16.6 | 16.5 |
| $ML_{1+4}$ @ 130° C. | 19.9 | 21.0 | 27.8 | 25.0 | 23.7 | 21.3 |
| | 56.3 | 81.9 | 90.0 | 91.6 | 80.2 | 80.2 |
| 300% modulus @ 23° C. (MPa) | 10.3 | 11.2 | 11.5 | 11.0 | 9.9 | 10.8 |
| | 9.9 | 14.6 | 16.5 | 14.4 | 14.7 | 14.6 |
| Tensile strength @ 23° C. (MPa) | 17.1 | 18.0 | 17.9 | 17.7 | 16.1 | 16.5 |
| | 12.6 | 14.5 | 16.3 | 14.5 | 15.6 | 16.3 |
| Temp, sweep 0° C. tan δ | 0.201 | 0.199 | 0.205 | 0.200 | 0.196 | 0.202 |
| | 0.165 | 0.235 | 0.242 | 0.235 | 0.234 | 0.240 |
| Temp, sweep 50° C. tan δ | 0.274 | 0.273 | 0.258 | 0.268 | 0.271 | 0.271 |
| | 0.225 | 0.190 | 0.174 | 0.182 | 0.196 | 0.185 |
| RDA 0.25-14% ΔG' (MPa) | 4.959 | 4.816 | 2.397 | 3.721 | 4.540 | 4.601 |
| | 9.461 | 2.629 | 2.628 | 2.793 | 2.812 | 2.570 |
| 50° C. RDA strain sweep (5% strain) tan δ | 0.2862 | 0.2685 | 0.2136 | 0.2372 | 0.2574 | 0.2583 |
| | 0.2472 | 0.1855 | 0.1825 | 0.1827 | 0.1677 | 0.1697 |
| 50° C. Dynastat tan δ | 0.2644 | 0.2457 | 0.2035 | 0.2193 | 0.2559 | 0.2390 |
| | 0.2224 | 0.1816 | 0.1726 | 0.1733 | 0.1718 | 0.1628 |

TABLE 5

Testing data from Examples 18-24

| | 18 | 19 | 20 | 21 | 22 | 23 | 24 |
|---|---|---|---|---|---|---|---|
| Mn (kg/mol) | 107 | 101 | 102 | 104 | 92 | 103 | 98 |
| Mw/$M_n$ | 1.06 | 1.06 | 1.16 | 1.27 | 1.10 | 1.08 | 1.05 |
| % coupling | 0 | 0 | 6.53 | 8.22 | 4.26 | 0 | 0 |
| $T_g$ (° C.) | −35.6 | −37.2 | −37.1 | −37.1 | −37.0 | −37.1 | −37.0 |
| Bound rubber (%) | 11.5 | — | 29.3 | 30.2 | 28.8 | 25.9 | 11.7 |
| | 18.2 | — | 80.1 | 82.8 | 83.9 | 82.9 | 76.8 |
| 171° C. MDRts0 (min) | 2.80 | — | 2.62 | 2.54 | 2.49 | 2.41 | 3.11 |
| | 7.38 | — | 6.92 | 6.67 | 5.53 | 5.85 | 6.96 |
| 171° C. MH-ML (kg-cm) | 18.0 | — | 16.9 | 16.1 | 15.9 | 17.6 | 17.1 |
| | 23.2 | — | 14.6 | 14.8 | 15.3 | 15.4 | 14.8 |
| $MLi_{+4}$ @ 130° C. | 26.8 | — | 30.0 | 30.3 | 29.0 | 29.0 | 23.2 |
| | 66.7 | — | 97.1 | 97.6 | 99.5 | 98.5 | 72.5 |
| 300% modulus @ 23° C. (MPa) | 10.8 | — | 11.2 | 10.9 | 10.4 | 12.0 | 10.3 |
| | 9.6 | — | 13.6 | 13.3 | 14.7 | 13.1 | 12.0 |
| Tensile strength @ 23° C. (MPa) | 17.1 | — | 16.3 | 17.7 | 17.9 | 19.1 | 17.3 |
| | 13.8 | — | 18.0 | 17.2 | 15.8 | 16.5 | 17.4 |
| Temp, sweep 0° C. tan δ | 0.214 | — | 0.215 | 0.220 | 0.203 | 0.208 | 0.192 |
| | 0.200 | — | 0.258= | 0.268 | 0.262 | 0.263 | 0.267 |
| Temp, sweep 50° C. tan δ | 0.262 | — | 0.249 | 0.253 | 0.249 | 0.247 | 0.275 |
| | 0.232 | — | 0.191 | 0.183 | 0.186 | 0.184 | 0.197 |
| RDA 0.25-14% ΔG' (MPa) | 5.187 | — | 2.179 | 2.579 | 2.361 | 3.061 | 5.324 |
| | 8.992 | — | 2.174 | 2.051 | 2.106 | 2.110 | 2.564 |
| 50° C. RDA strain sweep (5% strain) tan δ | 0.2471 | — | 0.1897 | 0.2083 | 0.2068 | 0.2144 | 0.2723 |
| | 0.2267 | — | 0.1620 | 0.1653 | 0.1595 | 0.1668 | 0.1843 |
| 50° C. Dynastat tan δ | 0.2393 | — | 0.1780 | 0.1999 | 0.1948 | 0.1941 | 0.2493 |
| | 0.2095 | — | 0.1651 | 0.1708 | 0.1609 | 0.1673 | 0.1858 |

Examples 25-30

Functionalized Polymers with Octamethylcyclotetrasiloxane Intermediate Units

The procedure described with respect to Examples 6-24 was, in substantial part, repeated. Sample 25 was quenched with isopropanol, while samples 26-29 involved reacting a BuLi-initiated SBR with octamethylcyclotetrasiloxane (instead of hexamethyl-trisiloxane as in Examples 6-24).

Sample 26 was quenched with isopropanol while samples 27-29 were reacted with, respectively, 3-aminopropyltrimethoxysilane, [3-(methylamino)propyl]trimethoxysilane, and 1,4-butane sultone. Sample 30 involved reacting a DAPDT-initiated SBR with octa-methylcyclotetrasiloxane followed by reaction with 3-aminopropyltriethoxysilane. All functionalized samples were quenched with isopropanol.

Each polymer sample was processed and compounded substantially as before. Physical properties of the resulting filled compounds are shown below in Table 6.

TABLE 6

Testing data from Examples 25-30

| | 25 | 26 | 27 | 28 | 29 | 30 |
|---|---|---|---|---|---|---|
| Mn (kg/mol) | 97 | 97 | 87 | 90 | 97 | 93 |
| $M_w/M_n$ | 1.03 | 1.03 | 1.23 | 1.13 | 1.03 | 1.15 |
| % coupling | 0 | 0 | 11.6 | 10.6 | 0 | 10.7 |
| Tg (° C.) | −35.6 | −35.0 | −35.4 | −35.8 | −35.4 | −36.3 |
| Bound rubber (%) | 9.8 | 10.5 | 30.3 | 25.3 | 11.7 | 31.3 |
| | 19.7 | 76.7 | 83.8 | 81.9 | 78.3 | 84.8 |
| 171° C. MDRt50(min) | 3.13 | 3.01 | 2.67 | 2.68 | 3.10 | 2.54 |
| | 7.86 | 7.56 | 6.92 | 6.92 | 7.15 | 6.22 |
| 171° C. MH-ML (kg-cm) | 17.1 | 18.1 | 16.3 | 16.8 | 17.1 | 20.2 |
| | 21.6 | 14.6 | 15.8 | 24.8 | 15.5 | 17.8 |
| $MU_4$ @ 130° C. | 19.6 | 19.6 | 26.5 | 24.6 | 20.3 | 33.3 |
| | 50.5 | 83.5 | 89.6 | 87.7 | 83.4 | — |
| 300% modulus @ 23° C. (MPa) | 10.3 | 10.8 | 11.7 | 10.8 | 10.2 | 13.6 |
| | 9.5 | 13.3 | — | 14.7 | 14.4 | 13.6 |
| Tensile strength @ 23° C. (MPa) | 14.9 | 15.4 | 16.4 | 16.0 | 14.7 | 17.3 |
| | 11.9 | 13.3 | 14.1 | 14.1 | 13.7 | 17.5 |
| Temp, sweep 0° C. tan δ | 0.217 | 0.204 | 0.229 | 0.207 | 0.213 | 0.228 |
| | 0.198 | 0.268 | 0.275 | 0.276 | 0.279 | 0.245 |
| Temp, sweep 50° C. tan δ | 0.271 | 0.260 | 0.256 | 0.268 | 0.263 | 0.210 |
| | 0.240 | 0.188 | 0.180 | 0.186 | 0.190 | 0.150 |
| RDA 0.25-14% ΔG' (MPa) | 6.000 | 5.510 | 2.651 | 3.447 | 5.104 | 2.425 |
| | 8.373 | 2.179 | 2.143 | 2.235 | 2.293 | 2.136 |
| 50° C. RDA strain sweep (5% strain) tan δ | 0.2955 | 0.2831 | 0.2307 | 0.2512 | 0.2874 | 0.1735 |
| | 0.2589 | 0.1820 | 0.1786 | 0.1705 | 0.1840 | 0.1473 |
| 50° C. Dynastat tan δ | 0.2767 | 0.2595 | 0.2057 | 0.2360 | 0.2624 | 0.1602 |
| | 0.2187 | 0.1688 | 0.1616 | 0.1562 | 0.1654 | 0.1358 |

Examples 31-36

Functionalized Polymers with Cyclohexene Oxide Intermediate Units

The procedure described with respect to Examples 6-24 was, in substantial part, repeated. Sample 31 was quenched with isopropanol, while samples 32-36 involved reacting BuLi-initiated SBR with cyclohexene oxide.

Sample 32 was quenched with isopropanol while samples 33-36 were reacted with 33) 3-aminopropyltrimethoxysilane,
34) [3-(methylamino)propyl]trimethoxysilane,
35) 2-dodecen-1-yl succinic anhydride, and
36) 1,4-butane sultone.

(Samples 33-36 were quenched with isopropanol after being reacted.)

Each polymer sample was processed and compounded substantially as before. Physical properties of the resulting filled compounds are shown below in Table 7.

TABLE 7

Testing data from Examples 31-36

| | 31 | 32 | 33 | 34 | 35 | 36 |
|---|---|---|---|---|---|---|
| $M_n$ (kg/mol) | 89 | 90 | 77 | 82 | 95 | 89 |
| $M_w/M_n$ | 1.04 | 1.04 | 1.12 | 1.07 | 1.08 | 1.03 |
| % coupling | 0 | 0 | 30.2 | 0 | 11.7 | 0 |
| Tg (° C.) | −33.6 | −33.9 | −33.6 | −33.6 | −33.7 | −33.4 |
| Bound rubber (%) | 9.1 | 9.5 | 16.7 | 15.9 | 13.1 | 10.5 |
| | 18.3 | 23.0 | 24.9 | 24.5 | 22.9 | 21.3 |
| 171° C. $MDRt_{50}$ (min) | 3.27 | 3.25 | 2.80 | 2.94 | 2.88 | 3.27 |
| | 8.63 | 8.12 | 8.28 | 7.60 | 6.37 | 8.40 |
| 171° C. MH-ML (kg-cm) | 15.5 | 16.5 | 16.9 | 16.2 | 16.9 | 15.8 |
| | 20.1 | 20.9 | 20.5 | 21.4 | 22.7 | 20.5 |
| $MU_4$ @ 130° C. | 18.3 | 18.5 | 20.0 | 20.2 | 21.3 | 18.2 |
| | 47.4 | 49.7 | 48.3 | 47.9 | 55.0 | 50.3 |
| 300% modulus @ 23° C. (MPa) | 9.7 | 10.7 | 11.4 | 10.9 | 11.1 | 10.0 |
| | 9.5 | 10.1 | 9.8 | 10.2 | 10.4 | 9.5 |
| Tensile strength @ 23° C. (MPa) | 14.3 | 15.8 | 16.5 | 16.4 | 17.1 | 14.6 |
| | 12.2 | 12.5 | 11.2 | 11.1 | 12.2 | 11.5 |
| Temp, sweep 0° C. tan δ | 0.224 | 0.228 | 0.230 | 0.224 | 0.225 | 0.231 |
| | 0.198 | 0.209 | 0.202 | 0.203 | 0.213 | 0.231 |
| Temp, sweep 50° C. tan δ | 0.310 | 0.284 | 0.281 | 0.286 | 0.281 | 0.287 |
| | 0.247 | 0.259 | 0.248 | 0.241 | 0.224 | 0.253 |
| RDA 0.25-14% ΔG' (MPa) | 4.691 | 5.170 | 4.570 | 4.656 | 4.783 | 4.713 |
| | 8.827 | 8.807 | 8.107 | 8.312 | 8.410 | 8.448 |
| 50° C. RDA strain sweep (5% strain) tan δ | 0.2918 | 0.2878 | 0.2711 | 0.2780 | 0.2669 | 0.2868 |
| | 0.2622 | 0.2568 | 0.2621 | 0.2506 | 0.2331 | 0.2540 |
| 50° C. Dynastat tan δ | 0.2745 | 0.2698 | 0.2598 | 0.2668 | 0.2568 | 0.2724 |
| | 0.1700 | 0.2385 | 0.1690 | 0.1778 | 0.1871 | 0.1563 |

Examples 37-42

Functionalized Polymers with Cyclohexene Sulfide Intermediate Units

The procedure described with respect to Examples 6-24 was, in substantial part, repeated. Sample 37 was quenched with isopropanol while samples 38-42 involved reacting BuLi-initiated SBR with cyclohexene sulfide.

Sample 38 was quenched with isopropanol while samples 39-42 were reacted with 39) 3-aminopropyltrimethoxysilane, 40) 2-dodecen-1-yl succinic anhydride, 41) 1-(3-bromopropyl)-2,2,5,5-tetramethyl-1-aza-2,5-disilacyclopentane, and 42) 1,4-butane sultone.

(Samples 39-42 were quenched with isopropanol after being reacted.)

Each polymer sample was processed and compounded substantially as before. Physical properties of the resulting filled compounds are shown below in Table 8.

Examples 43-48

Functionalized Polymers with Butylene Oxide Intermediate Units

The procedure described with respect to Examples 6-24 was, in substantial part, repeated. Example 43 was quenched with isopropanol while samples 44-48 involved reacting BuLi-initiated SBR with butylene oxide.

Sample 44 was quenched with isopropanol while samples 45-48 were reacted with 45) 3-aminopropyltrimethoxysilane, 46) [3-(methylamino)propyl]trimethoxysilane, 47) 2-dodecen-1-yl succinic anhydride, and 48) 1-(3-bromopropyl)-2,2,5,5-tetramethyl-1-aza-2,5-disilacyclopentane.

Each polymer sample was processed and compounded substantially as before. Physical properties of the resulting filled compounds are shown below in Table 9.

TABLE 8

Testing data from Examples 37-42

| | 37 | 38 | 39 | 40 | 41 | 42 |
|---|---|---|---|---|---|---|
| $M_n$ (kg/mol) | 96 | 103 | 103 | 100 | 102 | 70 |
| $M_w/M_n$ | 1.03 | 1.10 | 1.10 | 1.08 | 1.10 | 1.22 |
| % coupling | 0 | 15.3 | 16.4 | 10.1 | 14.6 | 43.5 |
| Tg (°C.) | −35.7 | −36.1 | −36.7 | −36.2 | −35.3 | −36.0 |
| Bound rubber (%) | 0 | 18.5 | 30.4 | 17.8 | 20.8 | 27.8 |
| | 2.9 | 10.3 | 22.4 | 23.0 | 31.9 | 14.7 |
| 171° C. MDR $t_{50}$ (min) | 3.01 | 2.84 | 2.63 | 2.47 | 2.93 | 3.14 |
| | 7.91 | 7.26 | 6.56 | 6.13 | 6.27 | 8.18 |
| 171° C. MH-ML (kg-cm) | 16.6 | 16.8 | 16.2 | 16.1 | 16.6 | 17.0 |
| | 20.9 | 22.7 | 22.6 | 22.4 | 21.9 | 16.8 |
| $ML_{1+4}$ @ 130° C. | 18.9 | 29.9 | 31.6 | 29.5 | 29.5 | 28.9 |
| | 56.3 | 66.7 | 67.5 | 68.1 | 69.2 | 79.4 |
| 300% modulus @ 23° C. (MPa) | 9.5 | 11.4 | 11.7 | 11.3 | 11.8 | 10.2 |
| | 9.4 | 10.9 | 11.1 | 10.4 | 9.8 | 9.0 |
| Tensile strength @ 23° C. (MPa) | 15.3 | 15.6 | 15.7 | 16.2 | 15.5 | 15.5 |
| | 12.6 | 14.9 | 14.2 | 14.2 | 13.7 | 13.9 |
| Temp, sweep 0° C. tan δ | 0.207 | 0.218 | 0.223 | 0.228 | 0.219 | 0.210 |
| | 0.174 | 0.188 | 0.193 | 0.181 | 0.193 | 0.191 |
| Temp, sweep 50° C. tan δ | 0.278 | 0.249 | 0.256 | 0.237 | 0.234 | 0.267 |
| | 0.225 | 0.219 | 0.224 | 0.213 | 0.219 | 0.219 |
| RDA 0.25-14% ΔG' (MPa) | 5.817 | 2.543 | 2.072 | 2.103 | 1.539 | 3.271 |
| | 8.183 | 6.667 | 5.977 | 6.863 | 5.333 | 4.263 |
| 50° C. RDA strain sweep (5% strain) tan δ | 0.2849 | 0.2182 | 0.2063 | 0.2090 | 0.1848 | 0.2441 |
| | 0.2595 | 0.2306 | 0.2122 | 0.2106 | 0.2173 | 0.2215 |
| 50° C. Dynastat tan δ | 0.2695 | 0.2053 | 0.2004 | 0.1993 | 0.1716 | 0.2261 |
| | 0.2338 | 0.2031 | 0.2018 | 0.2015 | 0.2021 | 0.2055 |

TABLE 9

Testing data from Examples 43-48

| | 43 | 44 | 45 | 46 | 47 | 48 |
|---|---|---|---|---|---|---|
| $M_n$ (kg/mol) | 96 | 98 | 91 | 92 | 98 | 99 |
| $M_w/M_n$ | 1.04 | 1.03 | 1.08 | 1.05 | 1.03 | 1.04 |
| % coupling | 0 | 0 | 6.4 | 3.2 | 1.8 | 3.1 |
| $T_g$ (° C.) | −36.1 | −35.9 | −35.5 | −36.1 | −35.8 | −35.5 |
| Bound rubber (%) | 8.3 | 9.0 | 14.5 | 5.9 | 7.9 | 9.4 |
| | 12.3 | 14.5 | 19.5 | 15.6 | 15.7 | 15.2 |
| 171° C. MDRt50(min) | 2.88 | 3.00 | 2.63 | 2.59 | 2.89 | 2.93 |
| | 7.02 | 6.90 | 6.52 | 5.78 | 6.29 | 6.94 |
| 171° C. MH-ML (kg-cm) | 16.6 | 16.5 | 16.5 | 16.6 | 16.5 | 16.7 |
| | 18.4 | 19.6 | 18.9 | 20.8 | 19.8 | 19.3 |
| MU4@ 130° C. | 20.0 | 21.0 | 22.2 | 20.8 | 20.3 | 20.4 |
| | 39.2 | 40.4 | 41.2 | — | 40.9 | 40.9 |
| 300% modulus @ 23° C. (MPa) | 10.2 | 9.9 | 10.5 | 10.5 | 10.3 | 10.4 |
| | 8.5 | 9.8 | 10.4 | 11.5 | 9.1 | 9.9 |
| Tensile strength @ 23° C. (MPa) | 15.3 | 16.2 | 16.4 | 15.2 | 16.7 | 17.2 |
| | 11.4 | 12.7 | 13.3 | 13.9 | 11.3 | 12.1 |
| Temp, sweep 0° C. tan δ | 0.202 | 0.211 | 0.202 | 0.212 | 0.213 | 0.212 |
| | 0.193 | 0.197 | 0.201 | 0.205 | 0.193 | 0.198 |
| Temp, sweep 50° C. tan δ | 0.261 | 0.274 | 0.265 | 0.271 | 0.261 | 0.270 |
| | 0.257 | 0.258 | 0.263 | 0.257 | 0.241 | 0.252 |
| RDA 0.25-14% ΔG' (MPa) | 5.395 | 4.820 | 4.507 | 4.911 | 4.392 | 5.190 |
| | 8.063 | 7.646 | 4.198 | 7.669 | 6.918 | 7.670 |
| 50° C. RDA strain sweep (5% strain) tan δ | 0.2764 | 0.2818 | 0.2729 | 0.2815 | 0.2730 | 0.2870 |
| | 0.2653 | 0.2570 | 0.2357 | 0.2386 | 0.2216 | 0.2458 |
| 50° C. Dynastat tan δ | 0.2572 | 0.2627 | 0.2506 | 0.2574 | 0.2538 | 0.2584 |
| | 0.2421 | 0.2322 | 0.2279 | 0.2288 | 0.2211 | 0.2310 |

We claim:

1. A method of providing an amine-functionalized polymer, comprising:
   a) in a reaction medium comprising at least one of a $C_5$-$C_{12}$ cyclic alkane, a $C_5$-$C_{12}$ acyclic alkane, an alkylated $C_5$-$C_{12}$ cyclic alkane, an alkylated $C_5$-$C_{12}$ acyclic alkane, or a liquid aromatic solvent, reacting a polymer that consists essentially of polyene mer and, optionally, vinyl aromatic mer, said polymer having a living terminus, with a cyclic compound comprising three or four siloxane units in its ring structure so as to provide an intermediate functionalized living polymer having at its terminus a radical of said cyclic compound, said radical constituting no more than about 400 g/mol of said intermediate functionalized living polymer; and
   b) introducing into said reaction medium an amine comprising an active hydrogen atom attached to the amino nitrogen atom of said amine and allowing said amine to chemically bond to said intermediate functionalized living polymer, thereby providing said amine-functionalized polymer.

2. The method of claim 1 wherein at least one of the silicon atoms of said cyclic compound comprises at least one $C_1$-$C_6$ substituent.

3. The method of claim 1 wherein each of the silicon atoms of said cyclic compound comprises at least one $C_1$-$C_6$ substituent.

4. The method of claim 3 wherein said cyclic compound is hexa-methylcyclotrisiloxane or octamethylcyclotetrasiloxane.

5. The method of claim 1 wherein said polymer has an overall 1,2-microstructure of from about 25 to 65%.

6. The method of claim 1 wherein said reaction medium further comprises a polar coordinating compound.

7. The method of claim 1 wherein said polymer comprises about 1 to about 50 weight percent vinyl aromatic mer units.

8. The method of claim 7 wherein said vinyl aromatic mer units are randomly distributed in said polymer.

9. The method of claim 8 further comprising removing said amine-functionalized polymer from said reaction medium and blending said amine-functionalized polymer with one or more types of filler particles so as to form a rubber compound.

10. The method of claim 9 wherein said rubber compound further comprises at least one other type of rubber.

11. The method of claim 10 wherein said rubber compound further comprises a vulcanizing agent.

12. The method of claim 11 further comprising vulcanizing said rubber compound.

13. The method of claim 1 further comprising removing said amine-functionalized polymer from said reaction medium and blending said amine-functionalized polymer with one or more types of filler particles so as to form a rubber compound.

14. The method of claim 13 wherein said rubber compound further comprises at least one other type of rubber.

15. The method of claim 14 wherein said rubber compound further comprises a vulcanizing agent.

16. The method of claim 15 further comprising vulcanizing said rubber compound.

* * * * *